United States Patent
Lin et al.

(10) Patent No.: US 9,998,575 B2
(45) Date of Patent: *Jun. 12, 2018

(54) NETWORK DEVICE AND METHOD FOR OUTPUTTING DATA TO BUS WITH DATA BUS WIDTH AT EACH CYCLE BY GENERATING END OF PACKET AND START OF PACKET AT DIFFERENT CYCLES

(71) Applicant: MEDIATEK INC., Hsin-Chu (TW)

(72) Inventors: Chi-Feng Lin, Hsinchu (TW); Wei-Jen Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/450,006

(22) Filed: Mar. 5, 2017

(65) Prior Publication Data

US 2017/0180519 A1 Jun. 22, 2017

Related U.S. Application Data

(63) Continuation of application No. 14/258,021, filed on Apr. 22, 2014, now Pat. No. 9,628,396.

(60) Provisional application No. 61/845,368, filed on Jul. 11, 2013.

(51) Int. Cl.
H04L 29/08 (2006.01)
H04L 12/40 (2006.01)
H04L 12/863 (2013.01)
H04L 12/811 (2013.01)

(52) U.S. Cl.
CPC ............ *H04L 69/324* (2013.01); *H04L 12/40* (2013.01); *H04L 47/38* (2013.01); *H04L 47/6245* (2013.01)

(58) Field of Classification Search
CPC ... H04L 47/38; H04L 47/6245; H04L 69/324; H04L 12/40
See application file for complete search history.

(56) References Cited

U.S. PATENT DOCUMENTS

| 5,018,171 A | 5/1991 | Perloff | |
| 6,937,624 B1 * | 8/2005 | Gavin | H04J 3/0632 370/520 |
| 7,184,404 B2 * | 2/2007 | Yen | H04L 47/10 370/235.1 |
| 8,160,089 B1 * | 4/2012 | Padiyar | H04L 12/413 370/445 |
| 2002/0131450 A1 * | 9/2002 | Yoshida | H04J 3/1617 370/474 |

(Continued)

FOREIGN PATENT DOCUMENTS

CN 101001332 A 7/2007

Primary Examiner — Rasheed Gidado
(74) Attorney, Agent, or Firm — Winston Hsu

(57) ABSTRACT

A method used in a network device for outputting data to a bus with a data bus width at each cycle includes: using a packet generating circuit for generating idle data after an end of packet for a packet at a cycle and generating a start of packet for a next packet at a different cycle; and using an inter-packet gap (IPG) generating circuit for receiving data transmitted from the packet generating circuit, dynamically writing the received data into the buffer, and inserting a gap of idle data between the end of packet and the start of packet according to the end of packet and the idle data generated by the packet generating circuit.

21 Claims, 16 Drawing Sheets

(56) References Cited

U.S. PATENT DOCUMENTS

| 2004/0071166 A1* | 4/2004 | Yen | H04L 47/10 |
| | | | 370/472 |
| 2008/0219669 A1* | 9/2008 | Fourcand | H04J 3/1617 |
| | | | 398/98 |
| 2009/0279559 A1* | 11/2009 | Wong | H04L 49/30 |
| | | | 370/412 |

* cited by examiner

| | | | | | | | | |
|---|---|---|---|---|---|---|---|---|
| 0x78 | I1 | I1 | I1 | I1 | I1 | I1 | I1 | I1 |
| 0x70 | I1 | I1 | I1 | I1 | I1 | I1 | I1 | I1 |
| 0x68 | I1 | I1 | I1 | I1 | I1 | I1 | I1 | I1 |
| 0x60 | I1 | I1 | I1 | I1 | I1 | I1 | T1 | D1 |
| ... | ... | ... | ... | ... | ... | ... | ... | ... |
| 0x18 | D1 | D1 | D1 | D1 | D1 | D1 | D1 | D1 |
| 0x10 | D1 | D1 | D1 | D1 | D1 | D1 | D1 | D1 |
| 0x08 | D1 | D1 | D1 | D1 | D1 | D1 | D1 | D1 |
| 0x00 | P | P | P | P | P | P | P | S1 |

FIG. 2B

| | | | | | | | | |
|---|---|---|---|---|---|---|---|---|
| 0x78 | D2 | D2 | D2 | D2 | D2 | D2 | D2 | D2 |
| 0x70 | P | P | P | P | P | P | P | S2 |
| 0x68 | I1 | I1 | I1 | I1 | I1 | I1 | I1 | I1 |
| 0x60 | I1 | I1 | I1 | I1 | I1 | I1 | T1 | D1 |
| ... | ... | ... | ... | ... | ... | ... | ... | ... |
| 0x18 | D1 | D1 | D1 | D1 | D1 | D1 | D1 | D1 |
| 0x10 | D1 | D1 | D1 | D1 | D1 | D1 | D1 | D1 |
| 0x08 | D1 | D1 | D1 | D1 | D1 | D1 | D1 | D1 |
| 0x00 | P | P | P | P | P | P | P | S1 |

FIG. 2C

| MOD | | | | EN_EOP | IBN | IS | | | | DS | | | |
|---|---|---|---|---|---|---|---|---|---|---|---|---|---|
| 0 | 1 | 2 | 3 | 1 | 0 | 8 | 7 | 6 | 5 | 4 | 5 | 6 | 7 |
| 4 | 5 | 6 | 7 | 2 | 0 | 12 | 11 | 10 | 9 | 0 | 1 | 2 | 3 |
| 8 | 9 | 10 | 11 | 2 | 0 | 8 | 7 | 6 | 5 | 4 | 5 | 6 | 7 |
| 12 | 13 | 14 | 15 | 3 | 0 | 12 | 11 | 10 | 9 | 0 | 1 | 2 | 3 |
| 16 | 17 | 18 | 19 | 3 | 0 | 8 | 7 | 6 | 5 | 4 | 5 | 6 | 7 |
| 20 | 21 | 22 | 23 | 4 | 0 | 12 | 11 | 10 | 9 | 0 | 1 | 2 | 3 |
| 24 | 25 | 26 | 27 | 4 | 0 | 8 | 7 | 6 | 5 | 4 | 5 | 6 | 7 |
| 28 | 29 | 30 | 31 | 4 | 1 | 12 | 11 | 10 | 9 | 0 | 1 | 2 | 3 |

FIG. 3A

| MOD | | | | EN_EOP | IBN | IG | | | | DG | | | |
|---|---|---|---|---|---|---|---|---|---|---|---|---|---|
| 0 | 1 | 2 | 3 | 2 | 0 | 16 | 15 | 14 | 13 | -4 | -3 | -2 | -1 |
|  | 5 | 6 | 7 | 3 | 0 |  | 19 | 18 | 17 |  | -7 | -6 | -5 |
| 8 | 9 | 10 | 11 | 3 | 0 | 16 | 15 | 14 | 13 | -4 | -3 | -2 | -1 |
|  | 13 | 14 | 15 | 4 | 0 |  | 19 | 18 | 17 |  | -7 | -6 | -5 |
| 16 | 17 | 18 | 19 | 4 | 0 | 16 | 15 | 14 | 13 | -4 | -3 | -2 | -1 |
|  | 21 | 22 | 23 | 4 | 1 |  | 19 | 18 | 17 |  | -7 | -6 | -5 |
| 24 | 25 | 26 | 27 | 4 | 1 | 16 | 15 | 14 | 13 | -4 | -3 | -2 | -1 |
|  | 29 | 30 | 31 | 4 | 2 |  | 19 | 18 | 17 |  | -7 | -6 | -5 |

FIG. 3B

| 0x60 | I1 | I1 | I1 | I1 | I1 | I1 | I1 | I1 |
|---|---|---|---|---|---|---|---|---|
| 0x58 | I1 | I1 | I1 | I1 | I1 | I1 | I1 | I1 |
| 0x50 | I1 | I1 | I1 | I1 | I1 | I1 | I1 | I1 |
| 0x48 | I1 | I1 | I1 | I1 | I1 | I1 | T1 | D1 |
| ... | ... | ... | ... | ... | ... | ... | ... | ... |
| 0x18 | D1 | D1 | D1 | D1 | D1 | D1 | D1 | D1 |
| 0x10 | D1 | D1 | D1 | D1 | D1 | D1 | D1 | D1 |
| 0x08 | D1 | D1 | D1 | D1 | D1 | D1 | D1 | D1 |
| 0x00 | P | P | P | P | P | P | P | S1 |

FIG. 6B

| 0x60 | D2 | D2 | D2 | D2 | D2 | D2 | D2 | D2 |
| --- | --- | --- | --- | --- | --- | --- | --- | --- |
| 0x58 | D2 | D2 | D2 | D2 | D2 | D2 | D2 | D2 |
| 0x50 | P | P | P | P | P | P | P | S2 |
| 0x48 | I1 | I1 | I1 | I1 | I1 | I1 | T1 | D1 |
| ... | ... | ... | ... | ... | ... | ... | ... | ... |
| 0x18 | D1 | D1 | D1 | D1 | D1 | D1 | D1 | D1 |
| 0x10 | D1 | D1 | D1 | D1 | D1 | D1 | D1 | D1 |
| 0x08 | D1 | D1 | D1 | D1 | D1 | D1 | D1 | D1 |
| 0x00 | P | P | P | P | P | P | P | S1 |

FIG. 6C

| MOD | | | | EN_EOP | IBN | IS | | | | DS | | | |
|---|---|---|---|---|---|---|---|---|---|---|---|---|---|
| 0 | 1 | 2 | 3 | 1 | 0 | 8 | 7 | 6 | 5 | 4 | 5 | 6 | 7 |
| 4 | 5 | 6 | 7 | 2 | 0 | 12 | 11 | 10 | 9 | 0 | 1 | 2 | 3 |
| 8 | 9 | 10 | 11 | 2 | 0 | 8 | 7 | 6 | 5 | 4 | 5 | 6 | 7 |
| 12 | 13 | 14 | 15 | 3 | 0 | 12 | 11 | 10 | 9 | 0 | 1 | 2 | 3 |
| 16 | 17 | 18 | 19 | 3 | 0 | 8 | 7 | 6 | 5 | 4 | 5 | 6 | 7 |
| 20 | 21 | 22 | 23 | 3 | 1 | 12 | 11 | 10 | 9 | 0 | 1 | 2 | 3 |

FIG. 7A

| MOD | | | | EN_EOP | IBN | IG | | | | DG | | | |
|---|---|---|---|---|---|---|---|---|---|---|---|---|---|
| 0 | 1 | 2 | 3 | 2 | 0 | 16 | 15 | 14 | 13 | -4 | -3 | -2 | -1 |
|   | 5 | 6 | 7 | 3 | 0 |    | 19 | 18 | 17 |    | -7 | -6 | -5 |
| 8 | 9 | 10 | 11 | 3 | 0 | 16 | 15 | 14 | 13 | -4 | -3 | -2 | -1 |
|   | 13 | 14 | 15 | 3 | 1 |    | 19 | 18 | 17 |    | -7 | -6 | -5 |
| 16 | 17 | 18 | 19 | 3 | 1 | 16 | 15 | 14 | 13 | -4 | -3 | -2 | -1 |
|   | 21 | 22 | 23 | 3 | 2 |    | 19 | 18 | 17 |    | -7 | -6 | -5 |

NETWORK DEVICE AND METHOD FOR OUTPUTTING DATA TO BUS WITH DATA BUS WIDTH AT EACH CYCLE BY GENERATING END OF PACKET AND START OF PACKET AT DIFFERENT CYCLES

CROSS REFERENCE TO RELATED APPLICATION

This is a continuation of U.S. non-provisional application Ser. No. 14/258,021 filed Apr. 22, 2014, which claims the benefit of U.S. provisional application No. 61/845,368 filed Jul. 11, 2013.

BACKGROUND

Generally speaking, a conventional network device applied to a high speed network such as 40 GHz Ethernet or 100 GHz Ethernet is arranged to generate a plurality of packets to the high speed network and to generate idle data between two consecutive packets. The number of idle data such as idle bytes to be generated between packets is preliminary configured, and the number configured is smaller than the number of total bytes generated by the conventional network device at each cycle. Thus, it is possible for the conventional network device to generate end of packet for this current packet and start of packet for the next packet at the same cycle. It is very difficult to implement or design the packet generation scheme for the conventional network device. In addition, the design for fixed number of idle bytes between each two packets may be impractical.

SUMMARY

Therefore one of the objectives of the present invention is to provide a network device and corresponding method used in the network device for outputting data to a bus with a data bus width at each cycle by generating end of packet and start of packet at different cycles and dynamically adjusting and outputting different numbers of idle bytes as a gap to be inserted between two packets, so as to solve the above-mentioned problems.

According to an embodiment of the present invention, a method used in a network device for outputting data to a bus with a data bus width at each cycle is disclosed. The method comprises: using a packet generating circuit for generating idle data after an end of packet for a packet at a cycle and generating a start of packet for a next packet at a different cycle; and using an inter-packet gap (IPG) generating circuit for receiving data transmitted from the packet generating circuit, dynamically writing the received data into the buffer, and inserting a gap of idle data between the end of packet and the start of packet according to the end of packet and the idle data generated by the packet generating circuit.

According to an embodiment of the present invention, a network device for outputting data to a bus with a data bus width at each cycle is disclosed. The network device comprises a packet generating circuit and an inter-packet gap (IPG) generating circuit. The packet generating circuit is used for generating idle data after an end of packet for a packet at a cycle and generating a start of packet for a next packet at a different cycle. The IPG generating circuit is coupled to the packet generating circuit and used for receiving data transmitted from the packet generating circuit, dynamically writing the received data into the buffer, and inserting a gap of idle data between the end of packet and the start of packet according to the end of packet and the idle data generated by the packet generating circuit.

According to the embodiments, the packet generating circuit generates end of packet for a current packet and start of packet for a next packet at different cycles, and the IPG generating circuit dynamically adjusts and outputs different numbers of idle bytes as a gap to be inserted between two packets. This can effectively reduce the circuit costs of the packet generating circuit and meet the requirement of IEEE 802.3 standard simultaneously.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2B is a diagram illustrating corresponding memory addresses of a buffer within IPG generating circuit for data example of FIG. 2A generated by packet generating circuit of FIG. 1 at different cycles C0-C5 when data are written into IPG generating circuit.

FIG. 2C is a diagram showing a result of data selected and transferred by IPG generating circuit according the example in FIG. 2B.

FIG. 3A is a diagram illustrating a look-up table for a relation between the gap of idle bytes and the deficit idle number compared to the average idle number according to different examples of EOP when the deficit idle counter is smaller than eight.

FIG. 3B is a diagram illustrating a look-up table for a relation between the gap of idle bytes and the deficit idle number compared to the average idle number counter according to different examples of EOP when the deficit idle counter is greater than or equal to eight.

FIG. 6B is a diagram illustrating corresponding memory addresses of a buffer within the IPG generating circuit for the data example of FIG. 6A generated by the packet generating circuit of FIG. 5 at different cycles C0-C5 when the data are written into the IPG generating circuit.

FIG. 6C is a diagram showing a result of the data selected and transferred by the IPG generating circuit according the example in FIG. 6B.

FIG. 7A is a diagram illustrating a look-up table for a relation between the gap of idle bytes and the deficit idle number compared to the average idle number in different examples of EOP when the deficit idle counter is smaller than eight according to the embodiment of FIG. 5.

FIG. 7B is a diagram illustrating a look-up table for a relation between the gap of idle bytes and the deficit idle number compared to the average idle number counter in different examples of EOP when the deficit idle counter is greater than or equal to eight according to the embodiment of FIG. 5.

DETAILED DESCRIPTION

Figure 1:
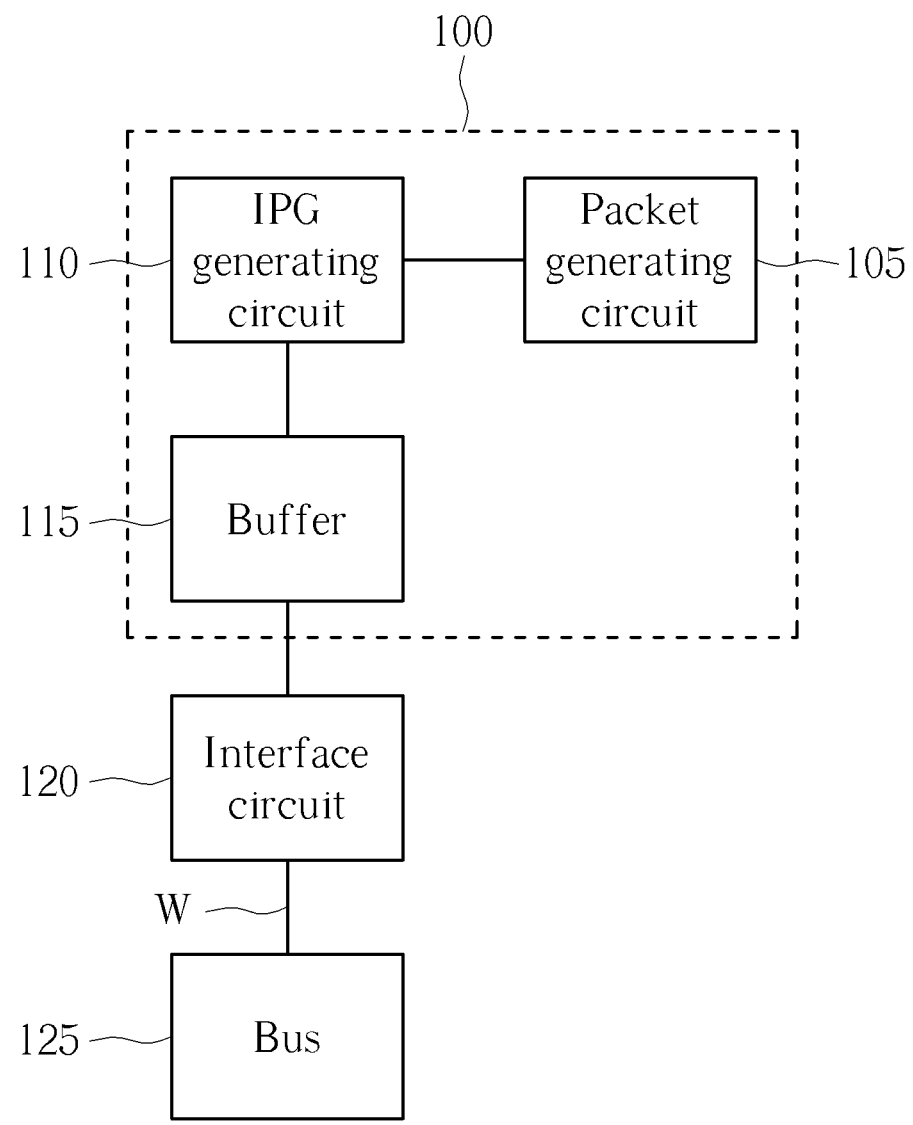
FIG. 1 is a diagram of a network device according to a first embodiment of the present invention.

FIG. 1 is a diagram of a network device 100 according to a first embodiment of the present invention. The network device 100 comprises a packet generating circuit 105, an inter-packet gap (IPG) generating circuit 110, and a buffer 115. The network device 100 is eternally coupled (but not limited) to an interface circuit 120 and a bus 125. The network device 100 is utilized for generating data (e.g. packets) to the bus 125 at different cycles according to the specification of IEEE 802.3 standard. For each packet, the network device 100 generates the start of this packet (can be abbreviated as SOP), the preamble, packet data, and the end of this packet (can be abbreviated as EOP). In addition, in accordance with the specification of IEEE 802.3 standard, the network device 100 generates and/or inserts enough idle data (e.g. idle bytes) between each two consecutive packets. The network device 100 is capable of generating/inserting enough idle bytes that meet the requirements specified by IEEE 802.3 standard. The number of idle bytes to be inserted between each two consecutive packets is also determined by the network device 100. The number of idle bytes varies and is not constant and fixed for different cycles. The network device 100 configures that the number of idle bytes falls within a range including a maximum value and a minimum value. In addition, the network device 100 configures that the average of number of idle bytes for different packets should meet the requirement of IEEE 802.3 standard. For example, the network device 100 may configure the number of idle bytes from 5 bytes (the minimum idle bytes) to 19 bytes (the maximum idle bytes) so as to achieve an average of 12 idle bytes and meet the requirements of IEEE 802.3 standard. However, this is not intended to be a limitation of the present invention.

The network device 100 generates data (including packets and idle bytes) into the bus 125 via the interface circuit 120. W*CS indicates a data bus width for transmitting data to the bus 125 where CS indicates the number of data bytes for one data column and W indicates the number of data columns at one cycle. Data generated by the network device 100 is buffered by the buffer 115 and then is read out from the buffer 115 and written into the bus 125 by the interface circuit 120 with the data bus width W*CS. In order to effectively reduce the circuit costs, in the first embodiment, the network device 100 employs the packet generating circuit 105 to generate more data than that corresponding to the data bus width W*CS at each cycle, and employs the IPG generating circuit 110 to write all packet data and appropriately write partial idle bytes. The IPG generating circuit 110 filters out a portion of the idle bytes generated by packet generating circuit 105. Specifically, the packet generating circuit 105 generates data (including packets and idles) with the wider data bus width (W+EB)*CS where EB*CS indicates additional data amount generated by the packet generating circuit 105 at each cycle. The IPG generating circuit 110 transfers all of packet data at a cycle, and passes only a portion of idle bytes rather than all idle bytes generated by the packet generating circuit 105. The IPG generating circuit 110 equivalently enables data writing of the buffer 115 for the selected portion of idle bytes and disables the data writing for unselected idle bytes. The idle bytes filtered/selected and packet data transferred by the IPG generating circuit 110 are buffered by the buffer 115, and the interface circuit 120 reads out the data from the buffer 115 and writes the data to the bus 120 with the data bus width W*CS. Accordingly, the network device 100 is capable of generating packet data and enough idle data into the bus 125 according to the data bus width W*CS specified by IEEE 802.3 standard. The packet generating circuit 105 stops data generating when the buffer 125 is full or is almost full. The determination of whether the buffer 125 is full or not can be made by the IPG generating circuit 110, and the IPG generating circuit 110 may notify the packet generating circuit 105 by sending a disable notification signal to the packet generating circuit 105 if the IPG generating circuit 110 determines that the buffer 125 is full. This implementation also falls within the scope of the present invention.

The data bus width W*CS, for example, includes 24 data bytes per cycle, i.e. three data columns per cycle; one data column includes 8 data bytes. This is not meant to be a limitation of the present invention. The packet generating circuit 105 generates more data than three data columns (i.e. 24 bytes) at each cycle. In the first embodiment, the packet generating circuit 105 generates four data columns (i.e. total 32 bytes) at each cycle. That is, EB mentioned above is equal to one. 32 bytes at each cycle may include packet data, a portion of preamble, EOP, SOP, and/or idle bytes, etc. Compared to the data bus width W*CS, the packet generating circuit 105 further generates one data column at each cycle. At a cycle, when the packet generating circuit 105 generates EOP for a current packet, the packet generating circuit 105 at this cycle fills the remaining byte spaces after the EOP with idle bytes. The packet generating circuit 105 generates idle data after the EOP at this cycle and generates SOP for a next packet at a different cycle.

In addition, the packet generating circuit 105 determines whether to generate idle bytes at the next cycle according to the number of remaining byte spaces after the EOP at this cycle. If the number of remaining byte spaces is greater than or equal to the minimum idle byte (e.g. five bytes) of above-mentioned idle byte range, the packet generating circuit 105 determines not to generate idle bytes at the next cycle and generates the SOP for the next packet at a beginning of the next cycle. If the number of remaining byte spaces is smaller than the minimum idle byte (e.g. five bytes), the packet generating circuit 105 determines to generate 32 idle bytes at the next cycle and generates the SOP for the next packet at a beginning of a cycle following the next cycle. That is, after generating the EOP, the packet generating circuit 105 is arranged to generate idle data to fill the remaining byte spaces at the same cycle and generates the SOP for the next packet at the beginning of a different cycle. Since the packet generating circuit 105 is not arranged to generate the EOP for this packet and the SOP for the next packet at the same cycle, this scheme can effectively reduce the costs of the packet generating circuit 105. The EOP and the SOP respectively correspond to different cycles.

Figure 2A:
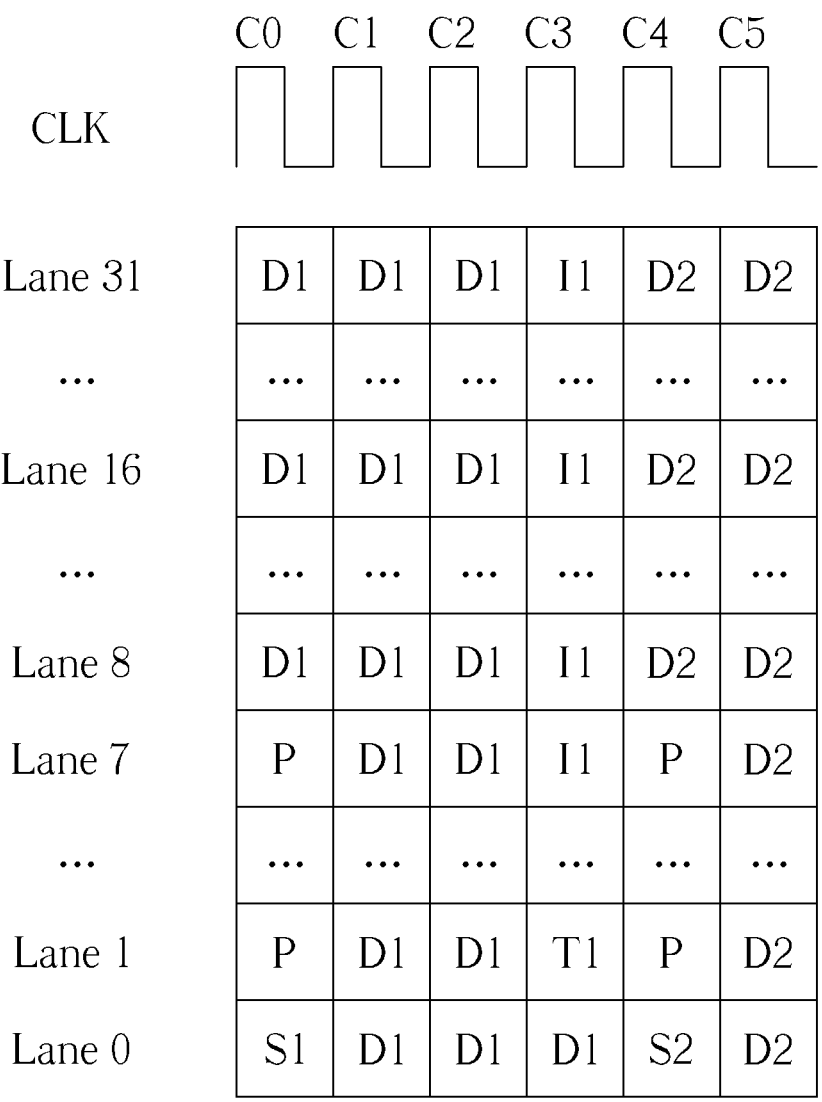
FIG. 2A is a diagram illustrating an example of data generated by packet generating circuit of FIG. 1 at different cycles C0-C5 of clock CLK.

FIG. 2A is a diagram illustrating an example of data generated by packet generating circuit 105 of FIG. 1 at different cycles C0-C5 of clock CLK. As shown in FIG. 2A, at cycle C0, the packet generating circuit 105 generates SOP S1 for a current packet, the preamble P of current packet, and packet data D1. At cycles C1 and C2, the packet generating circuit 105 generates packet data D1 of current packet. At cycle C3, the packet generating circuit 105 generates packet data D1, EOP T1 of current packet, and idle data I1 following EOP T1 of current packet wherein the remaining byte spaces after EOP T1 are filled with idle data (i.e. idle bytes) I1 by packet generating circuit 105. At cycle C4 following cycle C3, the packet generating circuit 105 generates SOP S2 of the next packet, preamble P, and packet data D2 of the next packet. At cycle C5, the packet generating circuit 105 generates packet data D2. It should be noted that this example is not intended to be a limitation of the present invention. In other embodiments, the packet generating circuit 105 instead may generate idle data I1 at cycle C4 and generate SOP S2 of the next packet, preamble P, and packet data D2 of the next packet at cycle C5.

Figure 2D:
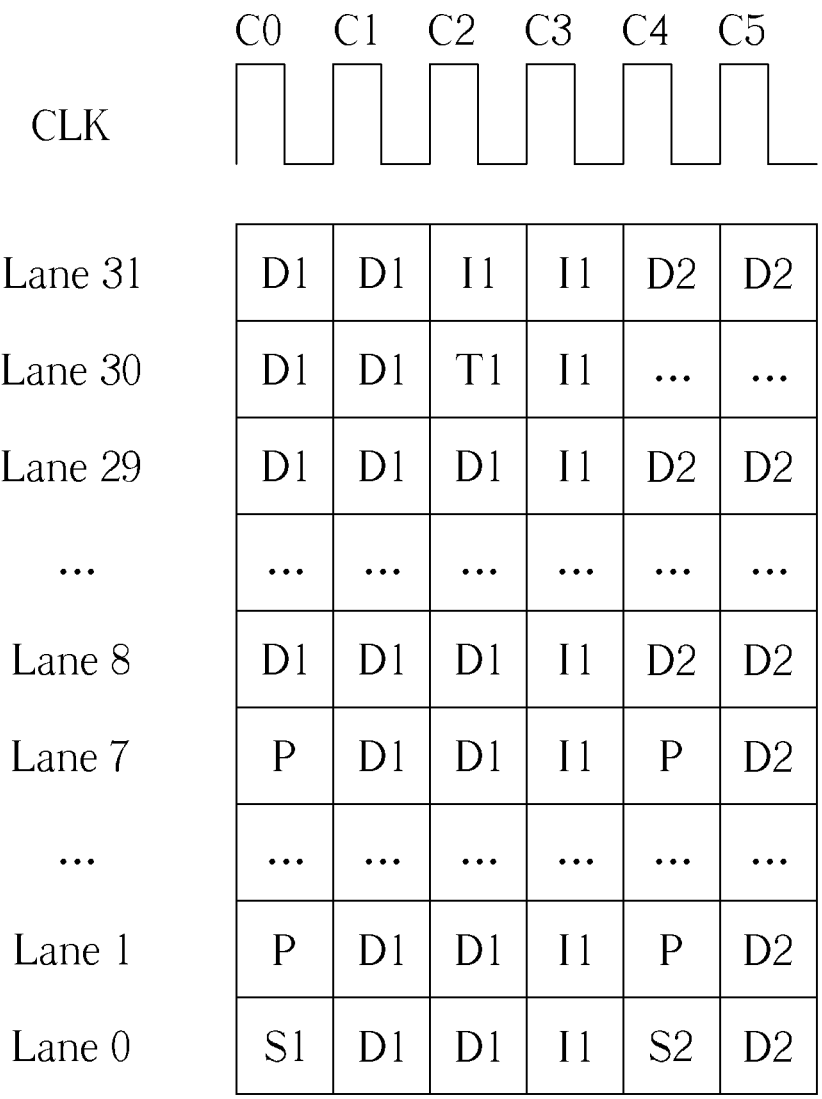
FIG. 2D is a diagram showing a different example of data generated by packet generating circuit of FIG. 1 at different cycles C0-C5.

FIG. 2D shows a different example of data generated by packet generating circuit 105 of FIG. 1 at different cycles C0-C5. SOP S2 of the next packet occurs at the next cycle C4 following cycle C3 or may occur at cycle C5 following the next cycle C4. The packet generating circuit 105 generates idle data I1 at cycle C4. That is, data generated at cycle C4 are all idle bytes in this example. This modification also falls within the scope of the present invention. As mentioned above, the packet generating circuit 105 is arranged to generate idle data and fills the remaining byte spaces after EOP T1 with idle data at cycle C3 and generates SOP S2 of the next packet at the beginning of a different cycle such as C4 or C5. The packet generating circuit 105 does not generate EOP T1 and SOP S2 at the same cycle. Lanes 0-31 indicate the wider data bus width (W+EB)*CS where W*CS includes 24 bytes and EB*CS includes 8 bytes.

FIG. 2B is a diagram illustrating corresponding memory addresses of a buffer within IPG generating circuit 110 for data example of FIG. 2A generated by packet generating circuit 105 of FIG. 1 at different cycles C0-C5 when data are written into IPG generating circuit 110. As shown in FIG. 2B, for example, data (including packet data D1, EOP T1 of current packet, and a portion of idle data I1) generated by packet generating circuit 105 at cycle C3 is positioned at columns having initial addresses 0x60-0x78. The portion of idle data I1 generated by packet generating circuit 105 at cycle C3 positioned at columns having initial addresses 0x70-0x78 is filtered out by IPG generating circuit 110.

As mentioned above, to reduce circuit costs and meet the specification of IEEE 802.3 standard, the packet generating circuit 105 generates more data than data amount specified by the specification of IEEE802.3 standard at each cycle. For bytes of packet data, the IPG generating circuit 110 transmits all packet data generated from packet generating circuit 105 to buffer 115. For bytes of idle data, the IPG generating circuit 110 selectively filters out a portion of idle bytes generated by packet generating circuit 105 and then selects and transfers/transmits selected idle bytes to buffer 115. The IPG generating circuit 110 is arranged to transmit partial idle data generated from packet generating circuit 105 to buffer 115. IPG generating circuit 110 does not transfer all of idle data generated by packet generating circuit 105 to buffer 115. The number of partial idle data transferred to buffer 115 is dynamically determined by IPG generating circuit 110 according to EOP T1 of current packet. For example, as shown in FIG. 2B, the packet generating circuit 105 at cycle C3 generates one byte for packet data and 31 idle bytes for idle data and the generated data respectively correspond to initial addresses 0x60-0x78 of four parallel columns as shown on the top of FIG. 2B. The idle data positioned at the columns having initial addresses 0x70 and 0x78 are filtered out by IPG generating circuit 110, and the data positioned at the columns having initial addresses 0x60 and 0x68 are selected and transferred by IPG generating circuit 110 to buffer 115.

FIG. 2C shows a result of data selected and transferred by IPG generating circuit 110 according the example in FIG. 2B. As shown in FIG. 2C, the gap of idle data between current packet and the next packet includes 15 bytes. The idle bytes for idle data I1 originally positioned in the columns having the initial addresses 0x70 and 0x78 are replaced by SOP S2 of the next packet, preamble P for the next packet, and packet data D2 for the next packet. In another example, the IPG generating circuit 110 may transfer a different number of idle bytes to buffer 115. The IPG generating circuit 110 may be arranged to dynamically output, generate, or insert a different number of idle bytes between each two consecutive packets, to averagely generate 12 idle bytes between two consecutive packets so as to meet the specification of IEEE802.3 standard.

In the following, the operation of IPG generating circuit 110 is detailed. The IPG generating circuit 110 filters out partial idle bytes so that the number of idle bytes inserted between two packets can meet the specification of IEEE 802.3 standard. The IPG generating circuit 110 determines the number of idle bytes to be inserted between two packets according to the number of remaining bytes after EOP in the same data column. The IPG generating circuit 110 further generates one data column for idle bytes each time when it is needed. If the number of remaining bytes after EOP in the same data column is smaller than the number of minimum idle bytes (e.g. five) specified by IEEE 802.3 standard, the IPG generating circuit 110 further adds/generates one data column of idle bytes into the remaining idle bytes after EOP in the same data column to form the idle bytes. If the number of remaining bytes after EOP in the same data column is not smaller than the number of minimum idle bytes (e.g. five) specified by IEEE 802.3 standard, the IPG generating circuit 110 does not add one data column of idle bytes into the remaining idle bytes and instead the IPG generating circuit 110 employs the remaining idle bytes after EOP in the same data column to form the idle bytes. For instance, the number of remaining idle bytes after EOP in the same data column may be equal to four smaller than five, and the IPG generating circuit 110 adds one data column of idle bytes (i.e. eight idle bytes) to the remaining four idle bytes to form twelve idle bytes (i.e. the average idle bytes specified by the IEEE 802.3 standard). Additionally, for instance, the number of remaining idle bytes after EOP in the same data column may be equal to seven which is not smaller than five, and the IPG generating circuit 110 uses the seven idle bytes to form the needed idle bytes.

The IPG generating circuit 110 is arranged to calculate and accumulate the number of deficit idle bytes to generate a deficit idle counter by comparing the number of idle bytes inserted between two packets with the average idle byte number specified by IEEE 802.3 standard. It should be noted that the number of deficit idle bytes indicates a difference between number of idle bytes and number of average idle bytes for a gap between two packets, and the deficit idle counter indicates a currently accumulated number of deficit idle bytes. The IPG generating circuit 110 compensates the total number of idle bytes that have been inserted by further adding a specific number of idle bytes into the selected idle bytes mentioned above to compensate/adjust the deficit idle counter once the deficit idle counter is greater than or equal to the specific number. In this embodiment, the specific number of idle bytes is configured by the IPG generating circuit 110 as the number of one data column, i.e. eight. The IPG generating circuit 110 compensates the total number of idle bytes that have been inserted between two packets each time when the deficit idle counter is not smaller than eight. It should be noted that the value of specific number is not intended to be a limitation of the present invention. Once the deficit idle counter is not smaller than eight, eight idle bytes is further added by the IPG generating circuit 110 to the selected idle bytes mentioned above to form resultant idle bytes to be inserted between two consecutive packets. If the deficit idle counter is smaller than the number of one data column (i.e. eight), the IPG generating circuit 110 in this situation does not add eight idle bytes into the selected idle bytes to form the gap of idle bytes to be inserted between two packets.

For instance, as shown in the above-mentioned example, if the number of remaining bytes after EOP in the same data column is smaller than five (e.g. the number of remaining bytes may be equal to three), the IPG generating circuit 110 selects the three idle bytes and one data column of idle bytes following the three idle bytes. That is, the IPG generating circuit 110 selects eleven idle bytes. The other unselected idle bytes are filtered out and/or ignored by the IPG generating circuit 110. The IPG generating circuit 110 calculates and determines that the deficit idle number compared to the average number is equal to one. The IPG generating circuit 110 accumulates and obtains the deficit idle counter based on the deficit idle number and the previous value of deficit idle counter. If the obtained deficit idle counter in this situation is smaller than eight, the IPG generating circuit 110 uses the selected eleven idle bytes to form the gap of idle bytes to be inserted between two packets. Accordingly, in this example, the total number of idle bytes to be inserted between two packets is equal to eleven.

However, if the deficit idle counter in this example is not smaller than eight, the IPG generating circuit 110 further adds eight idle bytes to the selected eleven idle bytes to generate nineteen idle bytes to be inserted for compensating the deficit idle counter, and uses the nineteen idle bytes to form the gap of idle bytes to be inserted between two packets. The deficit idle counter is then re-calculated by the IPG generating circuit 110 after compensating the deficit idle counter. Accordingly, the total number of idle bytes to be inserted between two packets is equal to nineteen. By calculating and accumulating the number of deficit idle bytes and compensating the number of deficit idle counter, the IPG generating circuit 110 can equally generate/insert the average number (i.e. 12) of idle bytes which meets the specification of IEEE 802.3 standard.

It should be noted that the IPG generating circuit 110 is arranged to transfer a portion of idle data generated from the packet generating circuit 105 into the buffer 115 and filter out the other portion of idle data generated from the packet generating circuit 105. The IPG generating circuit 110 transfers all packet data generated from the packet generating circuit 105. No packet data is filtered out by the IPG generating circuit 110. The IPG generating circuit 110 transfers all data of four data columns when the packet generating circuit 105 generates the SOP, the preamble, and the packet data. The IPG generating circuit 110 is arranged to transfer partial data at a cycle when the packet generating circuit 105 generates the EOP. Thus, at the cycle when the packet generating circuit 105 generates EOP, the IPG generating circuit 110 may transmit data including only one data column, two data columns, three data columns, or four data columns selected from the data generated by the packet generating circuit 105.

FIG. 3A is a diagram illustrating a look-up table for a relation between the gap of idle bytes and the deficit idle number compared to the average idle number according to different examples of EOP when the deficit idle counter is smaller than or equal to eight. FIG. 3B is a diagram illustrating a look-up table for a relation between the gap of idle bytes and the deficit idle number compared to the average idle number counter according to different examples of EOP when the deficit idle counter is greater than eight. As shown in FIG. 3A, the value of MOD indicates the different positions of EOP in the four data columns (i.e. 32 bytes) at the cycle such as cycle C3 shown in FIG. 2A. For example, as shown in FIG. 2A, the position of EOP T1 is equal to 1, and the value of MOD indicates '1'. In addition, for instance, the value '0' and '31' of MOD respectively indicate that EOP is at the beginning of the four data columns and is at the ending of the four data columns. EN EOP indicates the number of data column outputted from the IPG generating circuit 110 to the buffer 115 at the cycle when EOP occurs. The values from one to four of EN EOP respectively show that the IPG generating circuit 110 outputs the data size from one data column (i.e. 8 bytes) to four data columns (i.e. 32 bytes) indifferent cases. The value of IBN indicates whether the IPG generating circuit 110 further generates data columns for idle bytes at the next cycle following the cycle when EOP occurs. The value '0' of IBN indicates that the IPG generating circuit 110 does not generate data columns for idle bytes at the next cycle, and generates SOP for the next packet at the next cycle. The value '1' of IBN indicates that the IPG generating circuit 110 further generates one data columns for idle byte at the next cycle following the cycle when EOP occurs, and generates SOP for the next packet at the cycle following the next cycle. IS indicates the final number of gap of idle bytes to be inserter which are formed by adding EOP for this current packet. The minimum value of 'IS' of FIG. 3A is equal to the minimum idle number, i.e. five. The maximum value of 'IS' of FIG. 3A is equal to the average idle number, i.e. twelve. The value of DS indicates that the number of deficit idle bytes compared to the average idle number (i.e. twelve). The minimum value of DS of FIG. 3A is equal to zero which corresponds to the value '12' of IS, and the maximum value of 'IS' of FIG. 3A is equal to seven which corresponds to the minimum idle number specified by IEEE standard, i.e. five.

Accordingly, when the deficit idle counter is smaller than or equal to eight, the IPG generating circuit 110 can refer to the look-up table of FIG. 3A to obtain the number of enough idle bytes at this gap, determine how many bytes to be transmitted at this cycle, determine whether to further generate idle bytes at the next cycle, and to re-calculate the deficit idle counter based on the deficit idle number. In this case, the number of idle bytes determined and generated by the IPG generating circuit 110 may be equal to twelve or smaller than twelve. If EOP of this current packet corresponds to value '6' of MOD, the IPG generating circuit 110 at this cycle is arranged to write data of two columns (i.e. 16 bytes) into the buffer 115, and the IPG generating circuit 110 does not further generate 32 idle bytes at the next cycle and instead generates SOP of the next packet at the next cycle. In this example, the value of 'IS' corresponds to '10' which indicates that the gap (including idle bytes and EOP) between two packets should include ten bytes. That is, the IPG generating circuit 110 outputs two-column data (total 16 bytes) including six bytes for packet data, one byte for EOP, and nine bytes for idle data. The last two data columns for idle bytes are filtered out by the IPG generating circuit 110. The deficit idle counter is increased by two indicated by the value '2' of DS. Additionally, in another example, if EOP of this current packet corresponds to the value '30' of MOD, the IPG generating circuit 110 at this cycle is arranged to write data of four columns (i.e. 32 bytes) into the buffer 115, and the IPG generating circuit 110 further generates 32 idle bytes at the next cycle and to generate SOP of the next packet at the cycle following the next cycle; the packet generating circuit 105 is arranged to generate 32 idle bytes at the next cycle and generate the SOP of the next packet at the cycle following the next cycle. The value of 'IS' corresponds to '10' which indicates that the gap (including idle bytes and end of packet) between two packets should include ten bytes. That is, the IPG generating circuit 110 outputs five-column data (total forty bytes) including thirty bytes for packet data, one byte for EOP, and nine bytes for idle data at the current cycle and the next cycle. The last three data columns for idle data at the next cycle are filtered out by the IPG generating circuit 110. The deficit idle counter is increased by two indicated by the value '2' of DS.

The look-up table of FIG. 3B shows different examples of number of idle bytes to be inserted when the deficit idle counter has been greater than eight. In cases of FIG. 3B, the number of idle bytes determined and generated by the IPG generating circuit 110 is greater than twelve. As shown in FIG. 3B, the value of MOD indicates different positions of EOP in the four data columns (i.e. 32 bytes) at a cycle such as cycle C3 as shown in FIG. 2A. For example, the position of EOP T1 shown in FIG. 2A is equal to 1, and the value of MOD indicates '1'. In addition, for instance, the values '0' and '31' of MOD respectively indicate that EOP is at the beginning of the four data columns and is at the ending of the four data columns. EN EOP indicates the number of data column outputted from the IPG generating circuit 110 to the buffer 115. The values from two to four of EN EOP show that the IPG generating circuit 110 outputs the data size from two data columns (i.e. 16 bytes) to four data columns (i.e. 32 bytes) in different cases. Values of IBN indicate whether the IPG generating circuit 110 generates idle bytes at the next cycle and how many bytes are generated by the IPG generating circuit 110.

The value '0' of IBN indicates that the IPG generating circuit 110 does not generate idle bytes at the next cycle and instead generates SOP for the next packet at the next cycle. The value '1' of IBN indicates that the IPG generating circuit 110 generates one data column for idle bytes at the next cycle and generates the SOP for the next packet at the cycle following the next cycle. The value '2' of IBN indicates that the IPG generating circuit 110 generates two data columns for idle bytes at the next cycle and generates the SOP for the next packet at the cycle following the next cycle. The operation for IPG generating circuit 110 to further generate one data column for idle bytes can be regarded that the IPG generating circuit 110 at the next cycle selects one-column idle bytes (i.e. eight idle bytes at the beginning data column) from four-column idle bytes generated by the packet generating circuit 105. The operation for IPG generating circuit 110 to further generate two data columns for idle bytes can be regarded that the IPG generating circuit 110 at the next cycle selects two-column idle bytes (i.e. sixteen idle bytes at the beginning two data columns) from four-column idle bytes generated by the packet generating circuit 105. Values of IG indicate the number of bytes of gap to be inserted (including initially selected idle bytes and eight idle bytes that are further added) plus EOP between the two packets outputted by the IPG generating circuit 110. Values of DG indicate that the number of deficit idle bytes compared to the average idle number, i.e. twelve. The negative sign of values of DS indicates that the deficit idle counter should be decreased.

As shown in FIG. 3B, when the deficit idle counter is greater than eight, if EOP of this current packet corresponds to the value '6' of MOD, the IPG generating circuit 110 at this cycle writes data of three columns (i.e. 24 bytes) into the buffer 115, and the IPG generating circuit 110 does not further generate 32 idle bytes at the next cycle and instead generates SOP of the next packet at the next cycle. The value of IG corresponds to '18' which indicates that the gap (including idle bytes and EOP) between two packets includes eighteen bytes. That is, the IPG generating circuit 110 outputs three-column data (total 24 bytes) including six bytes for packet data, one byte for EOP, and seventeen bytes for idle data. The deficit idle counter is decreased by six indicated by the value '−6' of DG. Additionally, in another example, if EOP of this current packet corresponds to the value '30' of MOD, the IPG generating circuit 110 at this cycle writes data of four columns (i.e. 32 bytes) into the buffer 115 at this current cycle, and the IPG generating circuit 110 further selects 16 idle bytes from 32 idle bytes generated by the packet generating circuit 105 at the next cycle and generates SOP of the next packet at the cycle following the next cycle; the packet generating circuit 105 generates 16 idle bytes at the next cycle and generates the SOP of the next packet at the cycle following the next cycle. The value of IG corresponds to '18' which indicates that the gap (including idle bytes and EOP) between two packets includes eighteen bytes. That is, the IPG generating circuit 110 outputs six-column data (total forty-eight bytes) including thirty bytes for packet data, one byte for EOP, and seventeen bytes for idle data. The last two data columns for idle data at the next cycle are filtered out by the IPG generating circuit 110. The deficit idle counter is decreased by six indicated by the value '−6' of DG.

Figure 4A:
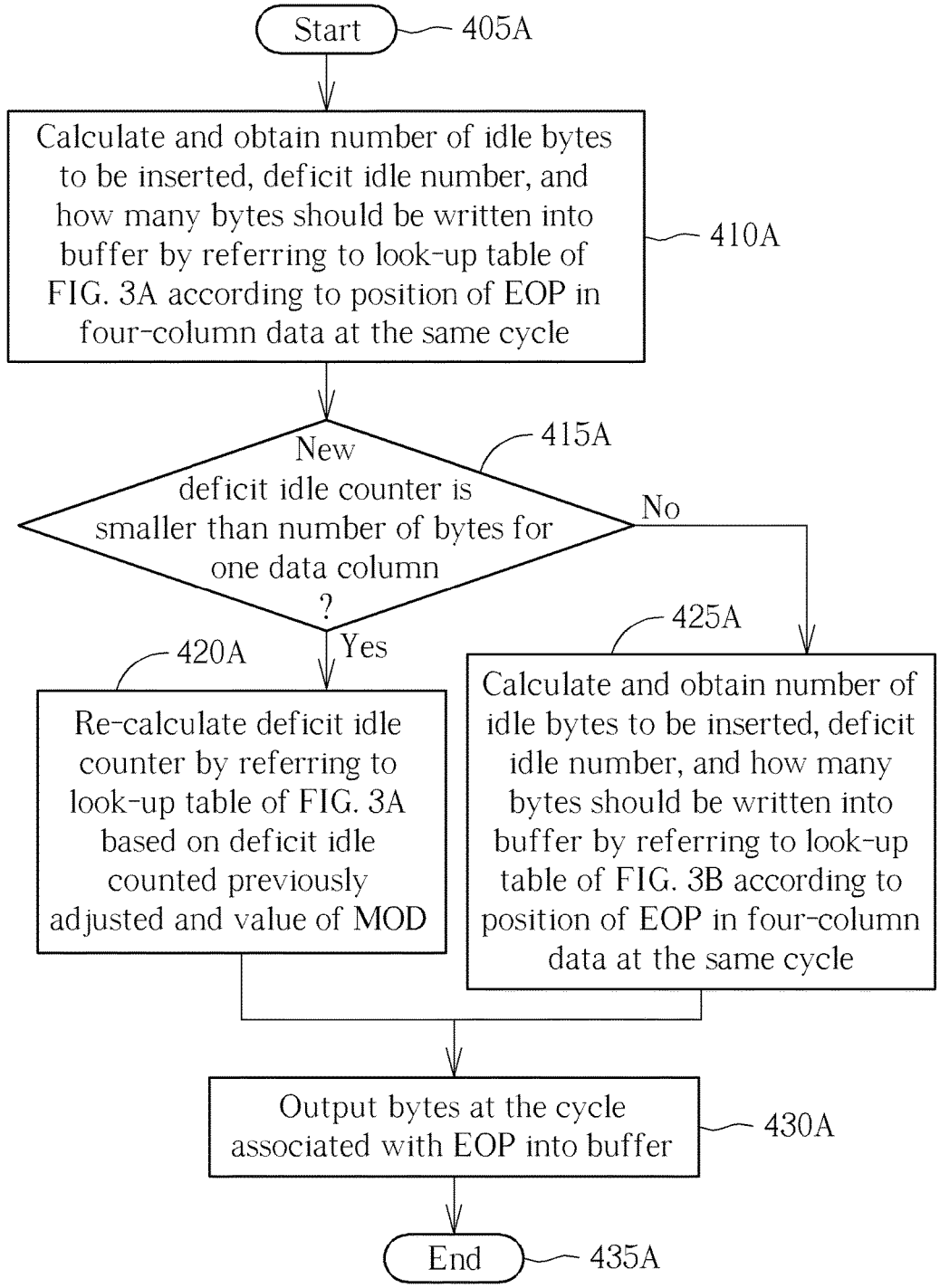
FIG. 4A is a flowchart of the operation of IPG generating circuit for processing data at a cycle when receiving EOP according to the embodiment shown in FIG. 1.

FIG. 4A is a flowchart of the operation of IPG generating circuit 110 for processing data at a cycle when receiving EOP according to the embodiment shown in FIG. 1. Provided that substantially the same result is achieved, the steps of the flowchart shown in FIG. 4A need not be in the exact order shown and need not be contiguous, that is, other steps can be intermediate. The steps of FIG. 4A are detailed in the following:

Step 405A: Start;

Step 410A: The IPG generating circuit 110 calculates and obtains the number of idle bytes to be inserted, the corresponding deficit idle number, and how many bytes should be written into the buffer 115 by referring to the look-up table of FIG. 3A in accordance with the position of EOP in the four-column data at the same cycle. For example, the IPG generating circuit 110 can obtain the number of idle bytes to be inserted, the corresponding deficit idle counter, and how many bytes should be written into the buffer 115 by referring to the look-up table of FIG. 3A according to the MOD value;

Step 415A: The IPG generating circuit 110 calculates the sum of corresponding deficit idle number and previously accumulated deficit idle number (i.e. the deficit idle counter) to adjust and obtain the adjusted deficit idle counter, and checks whether the adjusted deficit idle counter is smaller than the number of bytes for one data column (i.e. eight). If the adjusted deficit idle counter is smaller than eight, then the flow proceeds to Step 420A; otherwise, the flow proceeds to Step 425A;

Step 420A: The IPG generating circuit 110 re-calculates the deficit idle counter by referring to the look-up table of FIG.

3A based on the deficit idle counted previously adjusted and the value of MOD corresponding to EOP;

Step 425A: The IPG generating circuit 110 calculates and obtains the number of idle bytes to be inserted, the corresponding deficit idle number, and how many bytes should be written into the buffer 115 by referring to the look-up table of FIG. 3B in accordance with the position of EOP in the four-column data at the same cycle. For example, the IPG generating circuit 110 can obtain the number of idle bytes to be inserted, the corresponding deficit idle counter, and how many bytes should be written into the buffer 115 by referring to the look-up table of FIG. 3B according to the value of MOD;

Step 430A: The IPG generating circuit 110 outputs the bytes at the cycle associated with the end of packet into the buffer 115; and Step 435A: End.

Figure 4B:
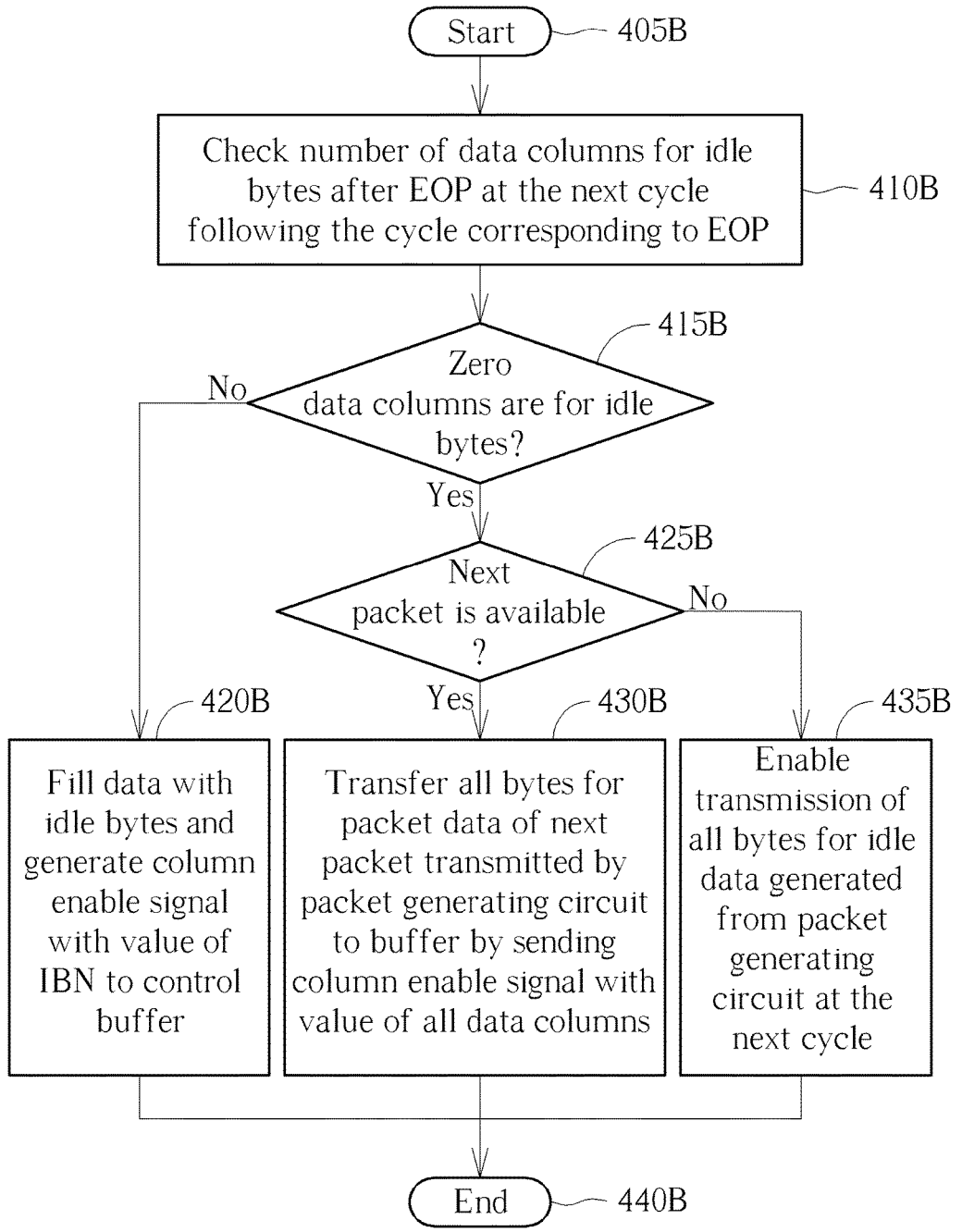
FIG. 4B is a flowchart of the operation of IPG generating circuit for processing/outputting data at a cycle following the cycle when receiving EOP according to the embodiment shown in FIG. 1.

FIG. 4B is a flowchart of the operation of IPG generating circuit 110 for processing/outputting data at a cycle following the cycle when receiving EOP according to the embodiment shown in FIG. 1. Provided that substantially the same result is achieved, the steps of the flowchart shown in FIG. 4B need not be in the exact order shown and need not be contiguous, that is, other steps can be intermediate. The steps of FIG. 4B are detailed in the following:

Step 405B: Start;

Step 410B: The IPG generating circuit 110 checks the number of data columns for idle bytes after EOP at the next cycle following the cycle corresponding to EOP;

Step 415B: The IPG generating circuit 110 determines whether zero data columns are for idle bytes. If zero data columns are for idle bytes, then the flow proceeds to Step 425B; otherwise, the flow proceeds to Step 420B;

Step 420B: IPG generating circuit 110 fills data with idle bytes and generates a column enable signal with the value of IBN to control the buffer 115;

Step 425B: The IPG generating circuit 110 checks whether the next packet is available. If available, the flow proceeds to Step 430B; otherwise, the flow proceeds to Step 435B;

Step 430B: The IPG generating circuit 110 transfers all bytes for packet data of the next packet transmitted by the packet generating circuit 105 to the buffer 120 by sending the column enable signal with the value of all data columns;

Step 435B: The IPG generating circuit 110 enables transmission of all bytes for the idle data that are generated from the packet generating circuit 410 at the next cycle; and Step 440B: End.

Figure 5:
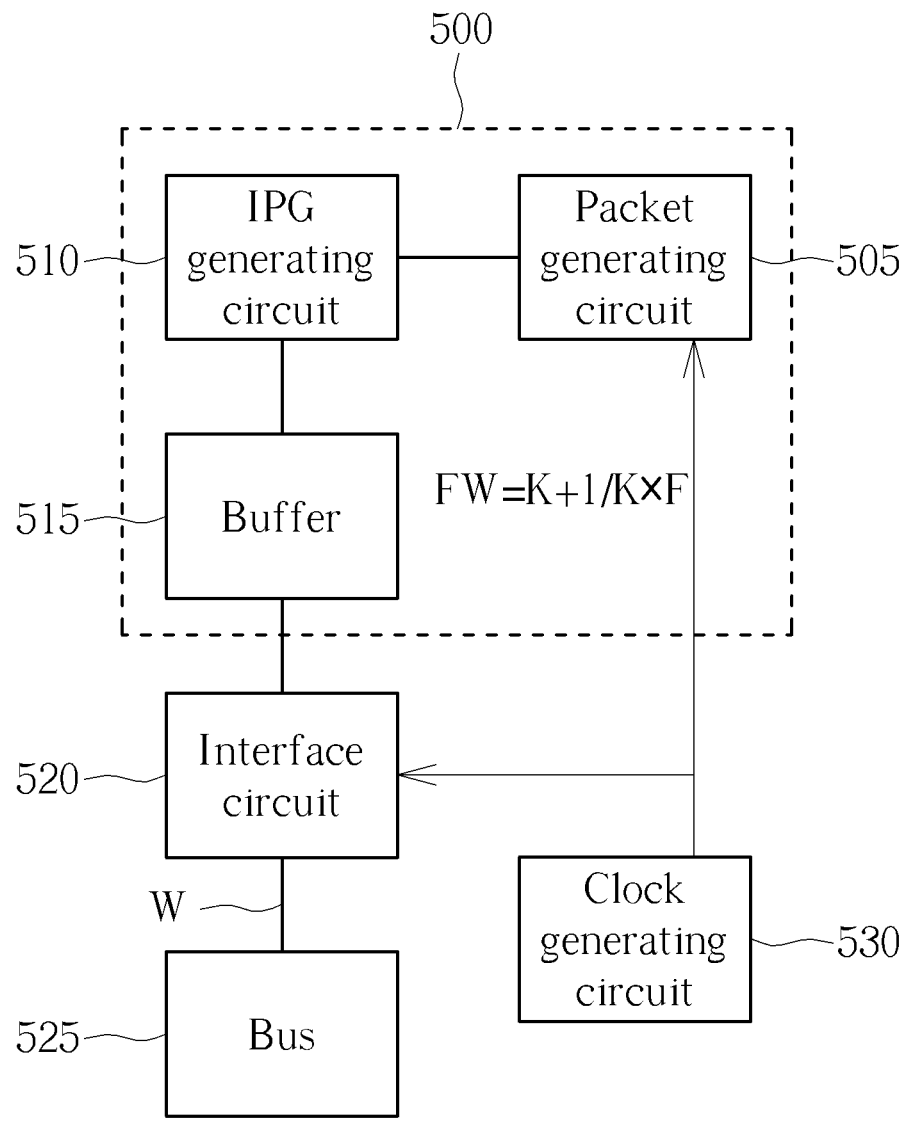
FIG. 5 is a diagram of a network device according to a second embodiment of the present invention.

FIG. 5 is a diagram of a network device 500 according to a second embodiment of the present invention. The network device 500 comprises a packet generating circuit 505, an inter-packet gap (IPG) generating circuit 510, and a buffer 515. The network device 500 is eternally coupled (but not limited) to an interface circuit 520, a bus 525, and a clock generating circuit 530. The network device 500 is also utilized for generating data (e.g. packets) to the bus 525 at different cycles according to the specification of IEEE 802.3 standard. For each packet, the network device 500 also generates SOP, the preamble, packet data, and EOP. In addition, the network device 500 also generates and/or inserts enough idle data (e.g. idle bytes) between each two consecutive packets. The number of idle bytes generated by the network device 500 between each two consecutive packets is also determined by the network device 500. The network device 500 also configures that the number of idle bytes falls within a range including a maximum value and a minimum value. In addition, the network device 500 also configures that the average of number of idle bytes for different packets should meet the requirement of IEEE 802.3 standard. The network device 500 also generates data (including packets and idle bytes) into the bus 525 via the interface circuit 520. W*CS indicates a data bus width for transmitting data to the bus 525. That is, data generated by the network device 500 is buffered by the buffer 515, and then the data is read out from the buffer 515 and written into the bus 525 by the interface circuit 520 with the data bus width W*CS.

Specifically, in the second embodiment, the network device 500 employs the packet generating circuit 505 to generate more data at a higher operating frequency FW and employs the IPG generating circuit 510 to operate at the higher operating frequency FW so as to write all packet data and appropriately write partial idle bytes. The higher operating frequency FW is provided by the clock generating circuit 530 and in this embodiment is equal to $(K+1)/K*F$ where K is equal to four and F indicates a normal operating frequency specified by IEEE 802.3 standard. For example, F is equal to 521 MHz and thus FW is equal to 652 MHz in an embodiment of 100 GHz high speed network. However, this is not intended to be a limitation of the invention.

The packet generating circuit 505 generates packets and idle data at the higher operating frequency FW, and the IPG generating circuit 510 operating at the higher operating frequency FW transfers all of packet data and passes partial idle bytes rather than all idle bytes generated by the packet generating circuit 505. The packet generating circuit 505 stops data generating when the buffer 525 is full or is almost full. For example, at each cycle, the packet generating circuit 505 generates data of three columns (i.e. 24 bytes) including packets and/or idle bytes. When the packet generating circuit 505 generates EOP for a current packet at a cycle, the packet generating circuit 505 at this cycle fills the remaining byte spaces after the EOP with idle bytes. The packet generating circuit 505 generates idle data (idle bytes) after the EOP at this cycle and generate SOP for a next packet at a different cycle. The packet generating circuit 505 determines whether to generate idle bytes at the next cycle according to the number of remaining byte spaces after the EOP at this cycle. If the number of remaining byte spaces is greater than or equal to the minimum idle byte of above-mentioned idle byte range, the packet generating circuit 505 determines not to generate idle bytes at the next cycle and generates the SOP for the next packet at a beginning of the next cycle. If the number of remaining byte spaces is smaller than the minimum idle byte of above-mentioned idle byte range, the packet generating circuit 505 determines to generate 24 idle bytes at the next cycle and generates the start of packet for the next packet at a beginning of a cycle following the next cycle. That is, after generating the EOP, the packet generating circuit 505 generates idle data to fill with the remaining byte spaces at the same cycle and generates the start of packet for the next packet at the beginning of a different cycle. Since the packet generating circuit 505 is not arranged to generate the EOP for this packet and the SOP for the next packet at the same cycle, this scheme can also effectively reduce the costs of the packet generating circuit 505. The EOP and the start of packet respectively correspond to different cycles.

The interface circuit 520 is arranged to operate with the higher operating frequency FW to read out data from the buffer 515 and then write the data into the bus 525 with the higher operating frequency FW. In order to meet the specification of IEEE 802.3 standard, the interface circuit 520 may be arranged to enable or disable data writing for the bus 525. For example, the interface circuit 520 may enable data writing of the bus 525 for K cycles and disable the data writing for one cycle during each K+1 consecutive cycles. K may be equal to four for 100 GHz Ethernet. Thus, the data throughput for the bus 525 still meets the requirement of IEEE 802.3 standard.

Figure 6A:
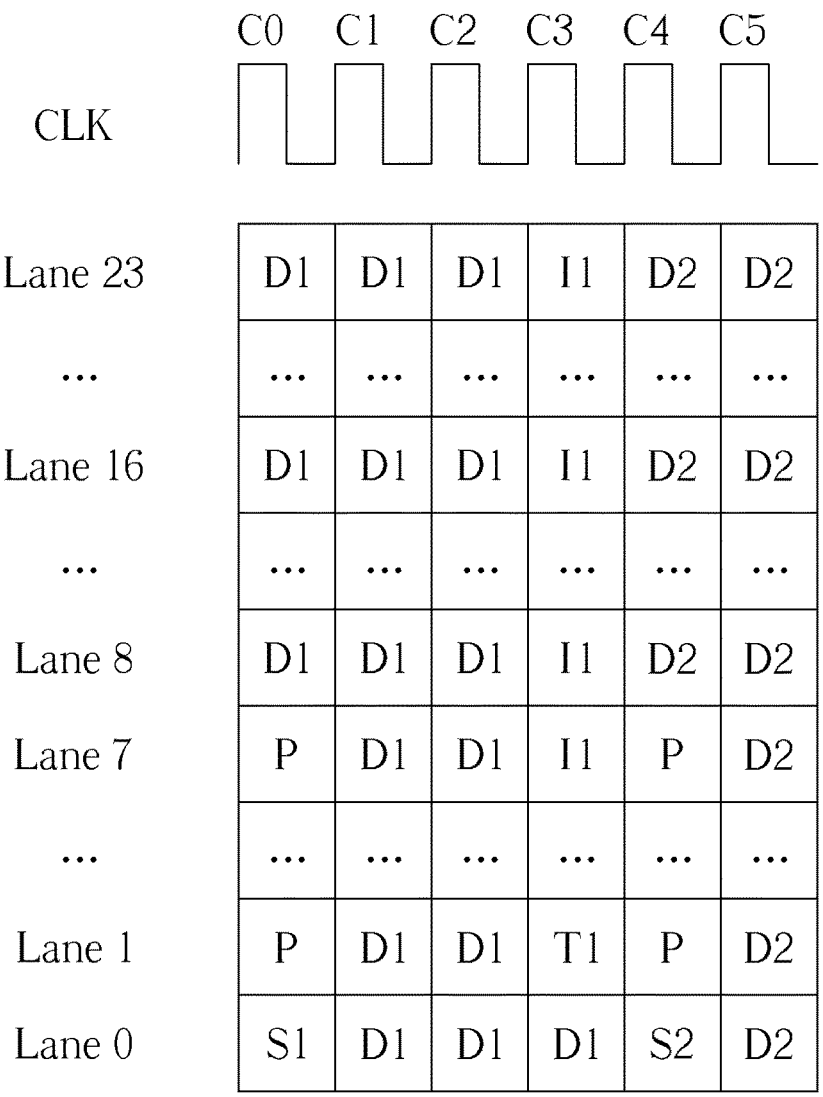
FIG. 6A is a diagram illustrating an example of data generated by the packet generating circuit of FIG. 5 at the higher frequency FW for different cycles C0-C5 of the clock CLK.

FIG. 6A is a diagram illustrating an example of data generated by the packet generating circuit 505 of FIG. 5 at the higher frequency FW for different cycles C0-C5 of the clock CLK. At cycle C0, the packet generating circuit 505 generates SOP S1 for a current packet, preamble P of the current packet, and packet data D1. At cycles C1 and C2, the packet generating circuit 505 generates packet data D1. At cycle C3, the packet generating circuit 505 generates packet data D1, EOP T1 of the current packet, and idle data I1 following the EOP T1 of the current packet wherein the remaining byte spaces after the EOP T1 are filled with idle data (i.e. idle bytes) I1 by the packet generating circuit 505. At cycle C4 following the cycle C3, the packet generating circuit 505 generates SOP S2 of the next packet, preamble P, and packet data D2 of the next packet. At cycle C5, the packet generating circuit 105 generates packet data D2. It should be noted that this example is not intended to be a limitation of the present invention. The packet generating circuit 505 generates idle data and fills the remaining byte spaces after EOP T1 with the idle data at the cycle C3 and generates the SOP S2 of the next packet at the beginning of a different cycle such as C4 or C5. The packet generating circuit 105 does not generate the EOP T1 and the SOP S2 at the same cycle. Lanes 0-23 indicate the data bus width W*CS including 24 bytes.

FIG. 6B is a diagram illustrating corresponding memory addresses of a buffer within the IPG generating circuit 510 for the data example of FIG. 6A generated by the packet generating circuit 505 of FIG. 5 at different cycles C0-C5 when the data are written into the IPG generating circuit 510. For example, data (including the packet data D1, the EOP T1 of the current packet, and a portion of idle data I1) generated by the packet generating circuit 505 at cycle C3 is positioned at the columns having initial addresses 0x48-0x58. The portion of idle data I1 generated by the packet generating circuit 505 at cycle C3 positioned at the columns having initial addresses 0x50-0x58 is filtered out by the IPG generating circuit 510. FIG. 6C shows a result of the data selected and transferred by the IPG generating circuit 510 according the example in FIG. 6B. As shown in FIG. 6C, the gap of idle data between the current packet and the next packet includes 7 bytes including six idle bytes and one byte for EOP of this current packet. In another example, the IPG generating circuit 510 may transfer a different number of idle bytes to the buffer 515. The IPG generating circuit 510 may be arranged to dynamically output, generate, or insert a different number of idle bytes to the buffer 515 between each two consecutive packets, to averagely generate 12 idle bytes between two consecutive packets so as to meet the specification of IEEE802.3 standard. It should be noted that the operation of IPG generating circuit 510 is similar to that of IPG generating circuit 110 shown in FIG. 1 and is not detailed again for brevity. A major difference is that the IPG generating circuit 510 operates at the higher operating frequency FW and processes three-column data at one cycle.

FIG. 7A is a diagram illustrating a look-up table for a relation between the gap of idle bytes and the deficit idle number compared to the average idle number in different examples of EOP when the deficit idle counter is smaller than eight according to the embodiment of FIG. 5. FIG. 7B is a diagram illustrating a look-up table for a relation between the gap of idle bytes and the deficit idle number compared to the average idle number counter in different examples of EOP when the deficit idle counter is greater than or equal to eight according to the embodiment of FIG. 5. The definitions of values of MOD, EN EOP, IBN, IS, DS, IG, and DG are similar to those of values recited in FIGS. 3A and 3B and are not detailed for brevity. A difference is that the look-up tables of FIGS. 7A and 7B are used for the IPG generating circuit 510 when operating at the higher operating frequency FW for processing 24 bytes at each cycle. The look-up tables of FIGS. 3A and 3B are used for the IPG generating circuit 110 when operating at a lower operating frequency for processing 32 bytes at each cycle.

Figure 8:
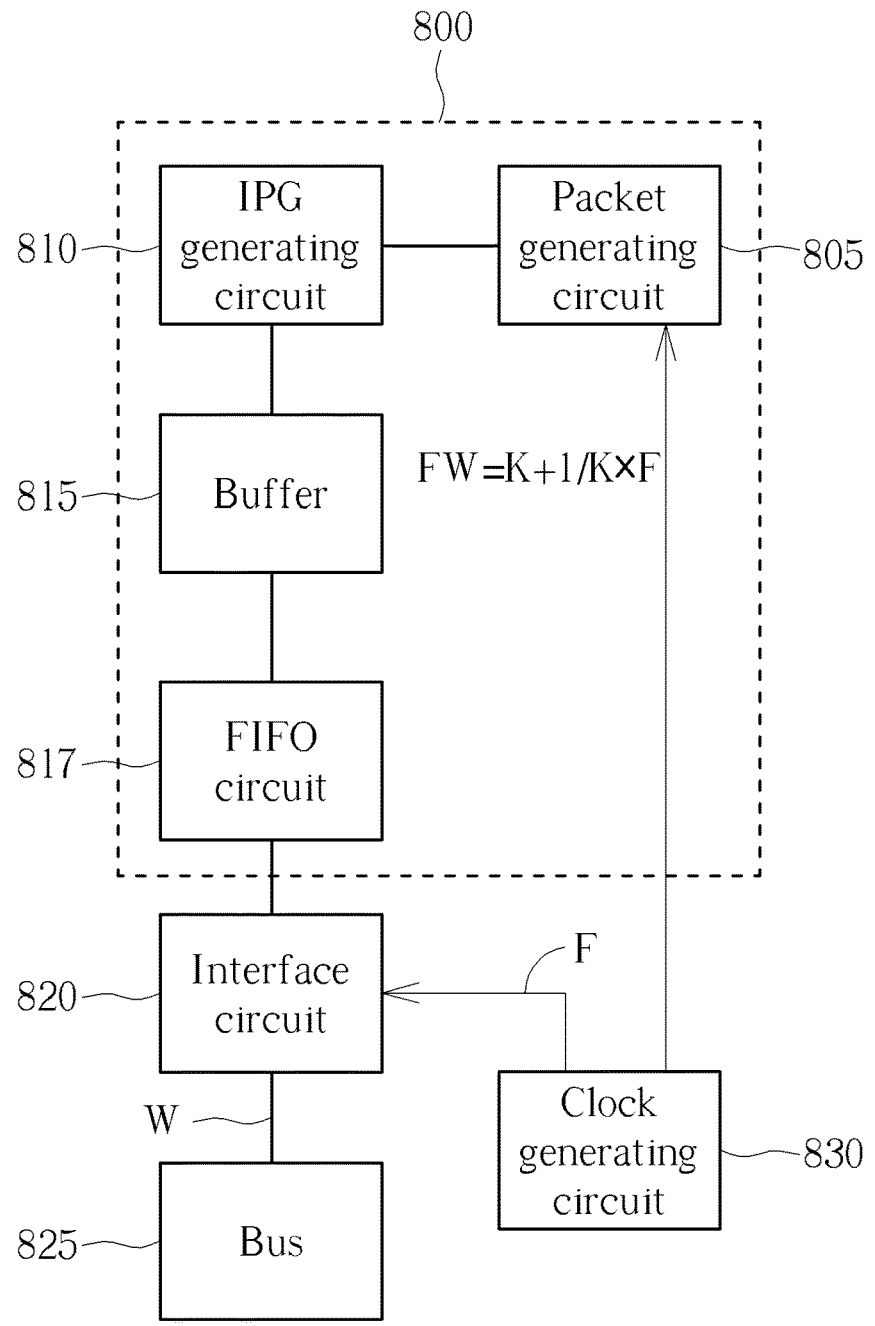
FIG. 8 is a diagram of a network device according to a third embodiment of the present invention.

In another embodiment, a first-in-first-out (FIFO) circuit may be positioned between a buffer and an interface circuit. FIG. 8 is a diagram of a network device 800 according to a third embodiment of the present invention. The network device 800 comprises a packet generating circuit 805, an inter-packet gap (IPG) generating circuit 810, a buffer 815, and an FIFO circuit 817. The network device 800 is eternally coupled (but not limited) to an interface circuit 820, a bus 825, and a clock generating circuit 830. The network device 800 can be also utilized for generating data (e.g. packets) to the bus 825 at different cycles according to the specification of IEEE 802.3 standard. For each packet, the network device 800 also generates SOP, the preamble, packet data, and EOP. In addition, the network device 800 also generates and/or inserts enough idle data (e.g. idle bytes) between each two consecutive packets. The number of idle bytes generated by the network device 800 between each two consecutive packets is also determined by the network device 800. The network device 800 also configures that the number of idle bytes falls within a range including a maximum value and a minimum value. In addition, the network device 800 also configures that the average of number of idle bytes for different packets should meet the requirement of IEEE 802.3 standard. The network device 800 also generates data (including packets and idle bytes) into the bus 825 via the interface circuit 820. W indicates a data bus width for transmitting data to the bus 825. That is, data generated by the network device 800 is buffered by the buffer 515, and then the data is read out from the buffer 815 and written into the bus 825 by the interface circuit 820 with the data bus width W. The FIFO circuit 817 reads out data from the buffer 815 with the higher operating frequency FW, and the data is written into the FIFO circuit 817 with the operating frequency FW. The interface circuit 820 reads out data from the FIFO circuit 817 with the normal frequency F and then writes the data into the bus with the normal frequency F. Thus, it is not needed to increase the rate for data access of the bus 825 from the normal operating frequency F to the higher operating frequency FW.

In addition, the embodiments mentioned above are not limited to 100 GHz Ethernet and can be also applied for other Ethernets such as 40 GHz Ethernet or 400 GHz Ethernet. The embodiments described above can be applied for all high-speed Ethernet networks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network device for outputting data to a bus with a data bus width at each cycle comprising:
a packet generating circuit, for generating idle data after an end of packet for a packet at a cycle and generating a start of packet for a next packet at a different cycle, the packet generating circuit generating data more than data corresponding to the data bus width at each cycle, and the generated data at each cycle corresponding to a data column size which is equal to a column size of the data bus width plus at least one data column; and an inter-packet gap (IPG) generating circuit, coupled to the packet generating circuit, for receiving data transmitted from the packet generating circuit, dynamically writing the received data into a buffer, and inserting a gap of idle data between the end of packet and the start of packet according to the end of packet and the idle data generated by the packet generating circuit;

wherein a number of bytes of the gap of idle data is different from a number of bytes of another gap of idle data.

2. The network device of claim 1, wherein the cycle is a first cycle and the different cycle is a second cycle following the first cycle; and, the packet generating circuit is arranged to generate the idle data after the end of packet during the first cycle and generate the start of packet at a beginning of the second cycle.

3. The network device of claim 1, wherein the cycle is a first cycle and the different cycle is a third cycle following a second cycle following the first cycle; and, the packet generating circuit is arranged to generate the idle data after the end of packet during the first cycle and the second cycle and generate the start of packet at a beginning of the third cycle.

4. The network device of claim 1, wherein the packet generating circuit is arranged to generate the data with a frequency higher than a rate of the data bus width, to generate the idle data after the end of packet at the cycle and the start of packet for the next packet at the different cycle; and the IPG generating circuit is arranged to process the data transmitted from the packet generating circuit with the frequency higher than the rate of the data bus width.

5. A method used in a network device for outputting data to a bus with a data bus width at each cycle, comprising:
using a packet generating circuit for generating idle data after an end of packet for a packet at a cycle and generating a start of packet for a next packet at a different cycle; and
using an inter-packet gap (IPG) generating circuit for receiving data transmitted from the packet generating circuit, dynamically writing the received data into a buffer, and inserting a gap of idle data between the end of packet and the start of packet according to the end of packet and the idle data generated by the packet generating circuit;
wherein a number of idle bytes generated by the packet generating circuit after the end of packet for the packet at the cycle is different from a number of idle bytes generated by the packet generating circuit after an end of packet for another different packet at another different cycle; and, the step of using the packet generating circuit for generating the idle data comprises: generating a number of bytes of the idle data for the gap of idle data between two packets according to a number of data bytes at the cycle corresponding to the end of packet for the packet.

6. The method of claim 5, wherein the cycle is a first cycle and the different cycle is a second cycle following the first cycle; and, the step of generating idle data after the end of packet at the cycle and generating the start of packet at the different cycle comprises:

generating the idle data after the end of packet during the first cycle; and
generating the start of packet at a beginning of the second cycle.

7. The method of claim 5, wherein the cycle is a first cycle and the different cycle is a third cycle following a second cycle following the first cycle; and, the step of generating idle data after the end of packet at the cycle and generating the start of packet at the different cycle comprises:
generating the idle data after the end of packet during the first cycle and the second cycle; and
generating the start of packet at a beginning of the third cycle.

8. The method of claim 5, further comprising:
using the packet generating circuit to generate data more than data corresponding to the data bus width at each cycle.

9. The method of claim 5, wherein the step of using the packet generating circuit comprises: using the packet generating circuit to generate the data with a frequency higher than a rate of the data bus width, to generate the idle data after the end of packet at the cycle and the start of packet for the next packet at the different cycle; and the step of using the IPG generating circuit comprises: using the IPG generating circuit to process the data transmitted from the packet generating circuit with the frequency higher than the rate of the data bus width.

10. The method of claim 5, wherein the step of inserting the gap of idle data comprises:
determining a number of idle bytes for the gap of idle data according to the end of packet and the idle data generated by the packet generating circuit; and
selecting the end of packet and a portion of the idle data following the end of packet to form the gap between two packets according to the number of idle bytes, and outputting the end of the packet and the portion of the idle data.

11. A network device for outputting data to a bus with a data bus width at each cycle comprising:
a packet generating circuit, for generating idle data after an end of packet for a packet at a cycle and generating a start of packet for a next packet at a different cycle; and
an inter-packet gap (IPG) generating circuit, coupled to the packet generating circuit, for receiving data transmitted from the packet generating circuit, dynamically writing the received data into the buffer, and inserting a gap of idle data between the end of packet and the start of packet according to the end of packet and the idle data generated by the packet generating circuit;
wherein a number of idle bytes generated by the packet generating circuit after the end of packet for the packet at the cycle is different from a number of idle bytes generated by the packet generating circuit after an end of packet for another different packet at another different cycle; and, the packet generating circuit is configured to generate a number of bytes of the idle data for the gap of idle data between two packets according to a number of data bytes at the cycle corresponding to the end of packet for the packet.

12. The network device of claim 11, wherein the packet generating circuit is arranged to generate data more than data corresponding to the data bus width at each cycle.

13. The network device of claim 11, wherein the cycle is a first cycle and the different cycle is a second cycle following the first cycle; and, the packet generating circuit is arranged to generate the idle data after the end of packet during the first cycle and generate the start of packet at a beginning of the second cycle.

14. The network device of claim 11, wherein the cycle is a first cycle and the different cycle is a third cycle following a second cycle following the first cycle; and, the packet generating circuit is arranged to generate the idle data after the end of packet during the first cycle and the second cycle and generate the start of packet at a beginning of the third cycle.

15. The network device of claim 11, wherein the IPG generating circuit is used for:
   calculating an initial number of idle bytes according to the end of packet for the packet;
   calculating a deficit idle number by comparing the initial number of idle bytes with an average number of idle bytes;
   accumulating a deficit idle counter for idle bytes by adding the deficit idle number into the deficit idle counter after an end of packet for a previous packet;
   according to the accumulated deficit idle counter, selectively referring to one of two different look-up tables to determine the number of idle bytes for the gap between two packets;
   wherein a first table of the look-up tables is associated with a number of idle bytes smaller than the average number, and a second table of the look-up tables is associated with a number of idle bytes not smaller than the average number.

16. The network device of claim 15, wherein when the deficit idle counter is smaller than or equal to a threshold number, the IPG generating circuit determines the number of idle bytes by referring to the first table and the end of packet for the packet where the deficit idle counter is increased and the determined number of idle bytes for the gap between two packets is not higher than the average number; and, when the deficit idle counter is greater than the threshold number, the IPG generating circuit determines the number of idle bytes by referring to the second table and the end of packet for the packet where the deficit idle counter is decreased and the determined number of idle bytes for the gap between two packets is higher than the average number.

17. The network device of claim 16, wherein the threshold number is a number of bytes for one data column.

18. The network device of claim 11, wherein the IPG generating circuit is arranged to determine a number of idle bytes for the gap of idle data according to the end of packet and the idle data generated by the packet generating circuit, to select the end of packet and a portion of the idle data following the end of packet to form the gap between two packets according to the number of idle bytes, and to output the end of the packet and the portion of the idle data to a buffer.

19. The network device of claim 11, wherein the packet generating circuit is arranged to generate the data with a frequency higher than the rate of the data bus width, to generate the idle data after the end of packet at the cycle and the start of packet for the next packet at the different cycle; and the IPG generating circuit is arranged to process the data transmitted from the packet generating circuit with the frequency higher than the rate of the data bus width.

20. The network device of claim 19, further comprising:
   a first-in-first-out circuit, coupled between the IPG generating circuit and the bus, for reading data transmitted from the IPG generating circuit with the frequency higher than the rate of the data bus width, and for outputting data to the bus with the rate of the data bus width.

21. The network device of claim 11, wherein the packet generating circuit is configured to generate the number of bytes of the idle data by comparing a configured minimum value of a number of the idle bytes with a number of remaining bytes after the end of packet for the packet at the cycle, and the number of remaining bytes after the end of packet for the packet at the cycle corresponds to the number of data bytes at the cycle.

* * * * *